(12) United States Patent
Goode

(10) Patent No.: US 9,879,778 B2
(45) Date of Patent: Jan. 30, 2018

(54) SIGMA BULB FOR USE WITH RV SLIDE OUT ROOMS AND WINDOWS

(71) Applicant: Tobin Michael Goode, Granger, IN (US)

(72) Inventor: Tobin Michael Goode, Granger, IN (US)

(73) Assignee: Titan Distribution, LLC, Elkhart, IN (US)

( * ) Notice: Subject to any disclaimer, the term of this patent is extended or adjusted under 35 U.S.C. 154(b) by 0 days.

(21) Appl. No.: 15/050,761

(22) Filed: Feb. 23, 2016

(65) Prior Publication Data

US 2016/0243973 A1    Aug. 25, 2016

Related U.S. Application Data

(60) Provisional application No. 62/119,545, filed on Feb. 23, 2015.

(51) Int. Cl.
| | |
|---|---|
| *B60P 3/00* | (2006.01) |
| *F16J 15/02* | (2006.01) |
| *B60P 3/34* | (2006.01) |

(52) U.S. Cl.
CPC ............... *F16J 15/025* (2013.01); *B60P 3/34* (2013.01); *F16J 15/027* (2013.01)

(58) Field of Classification Search
CPC .......... F16J 15/025; F16J 15/027; B60R 3/34; B60P 3/34
USPC ........................................................ 296/175
See application file for complete search history.

(56) References Cited

U.S. PATENT DOCUMENTS

| | | | |
|---|---|---|---|
| 5,237,782 A * | 8/1993 | Cooper | ............................ 52/67 |
| 6,048,016 A | 4/2000 | Futrell | |
| 6,966,590 B1 | 11/2005 | Ksiezopolki | |
| 7,735,891 B2 | 6/2010 | Goode | |
| 2002/0078634 A1 | 6/2002 | McManus | |

\* cited by examiner

*Primary Examiner* — Joseph D Pape
(74) *Attorney, Agent, or Firm* — Varnum, Riddering, Schmidt & Howlett LLP

(57) ABSTRACT

A seal assembly (400) is used with a slide-out room in a mobile living quarters. The seal assembly (400) includes three sealing lips (402) which are adapted to abut a top phalange (406) of a slide-out room when the room is a retracted position. The sigma seal (400) includes a pair of opposing concave walls 404 which are adapted to collapse when the slide-out room is in a retracted position. The sigma seal (400) is further adapted to be secured to a wall or a static surface (410) of a mobile living quarters.

11 Claims, 15 Drawing Sheets

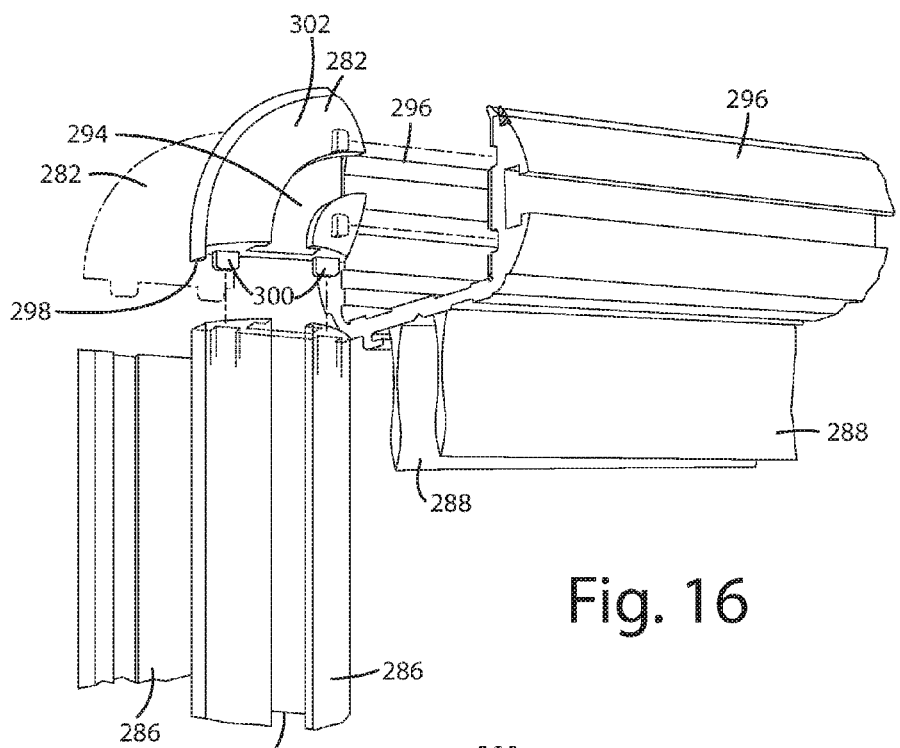
Fig. 16
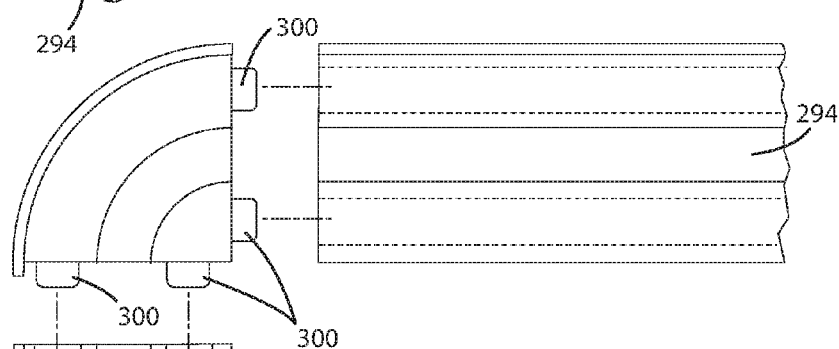
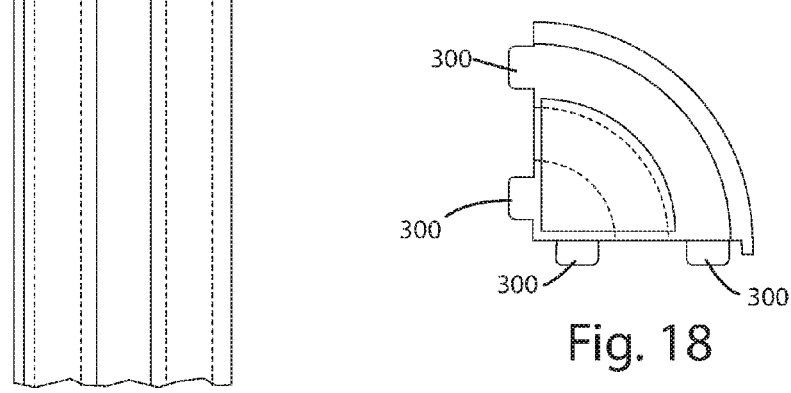
Fig. 17
Fig. 18

SIGMA BULB FOR USE WITH RV SLIDE OUT ROOMS AND WINDOWS

CROSS-REFERENCE TO RELATED APPLICATIONS

This application claims priority of U.S. Provisional Patent Application Ser. No. 62/119,545 filed Feb. 23, 2015.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Field of the Invention

The invention relates to devices for facilitating the sealing of perimeters of slide-out rooms and other structures associated with recreational vehicles (RVs) and other mobile products.

Background Art

The general concept of employing means for facilitating sealing of joints in the construction of structures such as towable trailers, motorized recreational vehicles, buildings (particularly metal buildings) and similar structures is known in the prior art. For many of these types of structures, a substantially rigid frame is provided, which consists of structural support members, such as studs. The structural support members of the frame support and mount walls on the exterior of the frame. The walls are formed as prefabricated panels placed on the exterior of the frame formed by the structural support members. Corners are formed at the junctures of adjacent panels lying in different, but typically perpendicular planes. Also, typically, one of the adjacent panels is intended to overlap the adjacent support members by the thickness of the adjacent panel. In this manner, the adjacent panels lie in perpendicular planes which meet at a butt joint. Concepts associated with technologies associated with corner rail extrusions are disclosed in Goode, U.S. Pat. No. 7,735,891 issued Jun. 15, 2010.

Resilient seals are often placed along the abutting edges of parts, and one such application is found in the field of mobile living quarters having slide-out rooms. A seal is commonly placed along the interface between the slide-out room and the opening in the sidewall of the mobile living quarters to prevent water, debris, and excessive air drafts from entering the interior of the mobile living quarters from the outside. This seal often includes two sub-parts, a bulb seal and a wiper seal, each extending along a side of the opening. The bulb seal is usually placed on either the exterior edge of the sidewall or the interior edge of a flange portion of the slide-out room wall to form a resilient seal between the sidewall and the flange portion of the slide-out room when the room is closed. A separate wiper seal is usually placed along the edge of the sidewall and flexibly protrudes against the adjacent sidewall of the slide-out room so as to be in constant contact with the sidewall at all positions of the room between its open and closed positions. A typical example of such an arrangement can be seen in U.S Patent Application Publication No. US 2002/0078634 A1, published Jun. 27, 2002. A problem with this type of seal arrangement is that the bulb seal and wiper seal must be mounted separately.

Another known seal arrangement used for the slide-out room includes a pair of bulb seals on opposite sides of a mounting portion, and a wiper seal protruding from an adjacent side of the mounting portion between the bulb seals, as disclosed in U.S. Pat. No. 6,048,016. The mounting portion is mounted to the edge of the sidewall of the mobile living quarters between the two opposite sides with a clip such that the wiper seal maintains flexible contact with the sidewall of the slide-out room. The two bulb portions contact one of two flange portions at either end of the slide-out room at both its open and closed positions to create a seal. This arrangement, however, may not be suitable for easy adaptation to be installed on different slide-out room configurations due to its unitary construction. Another problem is that, after long usage, the seal may disengage from the clip and fall off. If the seal falls off the clip, it can be difficult to access the clip for reinstalling the seal without taking the slide out room completely out of the wall.

Therefore, it would be desirable to have a multi-piece room seal that can be easily adapted for installation on different room configurations. It would also be desirable for the seal to be easily assembled on the exterior of the sidewall during installation to provide a single seal portion providing both a wiper seal for wiping against the sidewall of the slide-out room and a bulb seal for contacting the flange around the outside edge of the slide-out room when it is closed.

One prior art reference directed to the concepts associated with seals for slide-out rooms is Ksiezopolki, et al., U.S. Pat. No. 6,966,590 issued Nov. 22, 2005. For purposes of background art, the reference is duplicated in substantial part in the following paragraphs and in FIGS. 1-4. Referring now to prior art drawings in FIGS. 1-4, a mobile living quarters 10, such as a recreational vehicle, is shown having a slide-out room 12. Mobile living quarters 10 include a sidewall 14 having an opening 16 through which the slide-out room 12 shifts. Slide-out room 12 is of well known form including an interior space generally defined by four sidewalls 18 and an end wall 20. Slide-out room 12 fits through opening 16 and extends perpendicular to sidewall 14 such that its end wall 20 is adjacent the sidewall of the mobile living quarters when the slide-out room is retracted and spaced from the sidewall when the slide-out room is extended. A flange 22 extends outwardly from the peripheral edge of end wall 20 of the slide-out room to overlap with sidewall 14 of the mobile living quarters when slide-out room 12 is retracted.

A resilient seal 24 is located along the periphery of opening 16 to prevent dirt, water, and other materials from passing from the exterior of the mobile living quarters 10 to its interior. Seal 24 may be made of any sufficiently resilient material such as thermoplastic elastomer. Seal 24 includes a generally flat mounting portion, or clip portion, 26 with a lip 27 fitted about the edge of sidewall 14 and a wiper seal portion 28 protruding transversely from the mounting portion toward sidewall 18 of the slide-out room. Wiper seal portion 28 is a flexible, generally planar section with its distal end opposite mounting portion 26 in resilient contact with sidewall 18 such that the wiper seal is flexed against the sidewall to maintain an effective seal with the sidewall at all times during extension or retraction of the slide-out room. Seal 24 further includes a bulb seal portion 30 having a bulb part 33 and a clip part 35 which is slidably connected to mounting portion 26.

Mounting portion 26 includes oppositely extending, rail-like tabs 36, 38 which form a tongue 44 separated from the body of the mounting portion by a groove 46. Clip part 35 of bulb seal portion 30 includes tabs 32, 34 which form a groove 42 defined in part by opposing flanges 40. When mounting portion 26 and clip part 35 are connected together, tongues 44 fits into grooves 42. Tabs 32, 34, 36, 38 all extend lengthwise along seal 24 such that, once fitted together, bulb seal portion 30 may be slid along the length of mounting portion 26, and are flexible enough to allow them to snap past each other for assembly. Alternatively, clip part 35 of bulb seal portion 30 may be slid into mounting portion 26 from an end of the seal 24. Preferably, seal 24 is constructed such that mounting portion 26 is more rigid than wiper portion 28, and such that web 31 and tabs 32, 34 are more rigid than bulb part 33.

To install seal 24 onto the mobile living quarters about opening 16, pressure tape 52 having adhesive on both sides is applied to the exterior side of sidewall 14 along the edge of the opening where mounting portion 26 is to be attached. Mounting portion 26 is then located along the exterior edge of opening 16 in the sidewall 14 of the mobile living quarters by abutting lip 27 against the edge of the opening with tabs 36, 38 extending outwardly from the exterior side of sidewall 14 and wiper seal portion 28 extending toward sidewall 18 of the slide-out room. Next, pressure is applied to mounting portion 26 to press the mounting portion against pressure tape 52 to adhere the mounting portion to the sidewall. Fasteners 50 are then inserted through mounting portion 26 into sidewall 14 to firmly secure the mounting portion to the sidewall. Fasteners 50 are preferably screws driven through mounting portion 26 in the space between tabs 36, 38 so as to be hidden behind bulb seal portion 30 when in its mounted position. Next, clip part 35 of bulb seal portion 30 is mounted to mounting portion 26 by either snap fitting grooves 42 about tongues 44 or sliding the bulb seal portion at its groove about the tongue of the mounting portion from one end of the mounting portion. Bulb seal portion 30 is then adjusted in location along mounting portion 26 by sliding the bulb seal portion along the mated tongue 44 and groove 42 connection to its desired final location relative to mounting portion 26. Bulb seal portion 30 may be secured in its final position along mounting portion 26 by placing a fastener 48, preferably a screw, at an angle through only the internal web 31 of the bulb seal portion and the mounting portion near the end of the seal section. Fastener 48 preferably does not penetrate the bulb part 33 of bulb seal 30 in order to maintain a better seal with room flange 22. Bulb seal portion 30 may be subsequently replaced by removing fasteners 48 and installing a new section of bulb seal portion without having to replace the wiper portion.

Seal 24 may be easily adapted to fit to different slide-out room configurations by cutting to any necessary length. A variety of different corner configurations in the opening 16 may be easily adapted to by cutting the bulb seal portion 30 to a different length than the mounting portion 26, and the wiper seal portion 28 may be cut to a third length if necessary. A variety of different gaps between the mobile living quarter's sidewall 14 and the slide-out room sidewalls 18 may be easily adapted to by adjusting the lateral position of the mounting portion 26 relative to the sidewall 14 or trimming back the wiper seal portion 28. By mounting the mounting portion 26 and the bulb seal portion 30 to the exterior side of sidewall 14, subsequent repair and replacement of worn seal parts may be easily performed without having to remove the slide out room 12 from the opening 16 in wall 14.

In general, a number of the seal systems being used for slide-out rooms, utilize a semi-rigid plastic jacket as a "base element" to build a sealing system. Many of these known systems offer the relatively same physical configurations, with respect to the overall dimension of the wipe height, and bulb heights. However, a number of these known systems suffer some common disadvantages. For example, even with the use of a corner piece, many of these systems cannot provide a single, continuous seal around the perimeter of the slide-out room (in this case, the term "perimeter" means the sides and top of the slide-out room opening, excluding the bottom portion of the opening). That is, the known systems are required to have parts which will somehow splice together or simply overlap, but again do not provide for a single continuous seal.

With respect to a number of these known systems, the structure and function of the jacket instruction results in certain disadvantages. For example, the use of these jackets can result in the creation of a gap which is formed when there is an attempt to compress the jacket over the sidewall of an RV or some other vehicle. That is, the shoulders of the jacket are typically wider than the wall. Further, the legs of the jacket will "angle in" so as to create a compression of the edge of the sealing lip. Such a design essentially opens a gap from the shoulder, down to the sealing lip. Such a gap creates a potential leak path, when the same is installed. This is a substantial problem, particularly with respect to the vertical installation on the sidewalls.

To date, a D-bulb has been the ideal solution for sealing all windows, baggage doors, entry doors and also on slide-out seals. The seals have been made of sponge EPDM, solid EPDM and thermoplastics such as TPE and TPV. Despite the material that these are made of, the D-bulbs have inherent flaws, such as the following:

1. The seal relies on one contact point. If not compressed enough, the seal will allow wind and water to "slide" over the bulb, as shown in FIG. 26.
2. The "D" profile doesn't always compress straight down and the bulb tends to shift. This can open up the seal for compression failure or cause accelerated wear.
3. If the "D" profile has to bend or follow a 90 degree turn to the side, the profile will pucker and distort, and not create a seal.
4. The "D" shape has to fold into itself to compress. If you try and use a higher durometer (i.e., hardness) to improve the wear, the harder the seal is to compress.
5. If the seal is not compressed all the way flat (i.e., line to line or top to bottom), the higher the wind and water force, the more likely the seal is to leak. The seal cannot accommodate for pressure change to a great extent.
6. On a vertical application, a "D" profile allows water to build up along the sealing edge and run back and forth until it finds a way to pass. That is, the radius top allows the water to flow to the sealing point when applied to an application where the profile will be vertical. The water can run over the radius and gather along the sealing edge and run back and forth until the water finds a way to seep.

SUMMARY OF THE INVENTION

In accordance with the invention, a "sigma"-shaped seal profile element is provided, which can accommodate and substantially correct many of the flaws of the D-bulb, by changing the profile and the manner in which the seal collapses. The seal has three sealing lips along the non-bonded first style, which is shown in FIG. 29. Alternatively, as shown in FIG. 30, the sealing lips can be pressed in place. The lips create additional sealing points, and the contoured sides act as a gutter to divert water away from the sealing points. The contoured sides also act like a pneumatic seal (U-cup) when installed between two making parts. When the wind or water pressure increases, it positively actuates the contoured cup and energizes the sealing lips. The higher the pressure, the greater the seal.

The contoured sides of the sigma seal allow the sealing edge to collapse straight down, and not rock from side to side, or cause distortion to the sealing area. The inside of the legs will have a wedge shape removed to promote correct compression, or the legs can also have situations to perform the same function. This design will allow for a higher durometer of material to be used, since the design allows for lower compression force and will extend the life of the seal.

In accordance with other concepts of the invention, the contoured side also allow for the seal to make direction installation possible. When the seal has to bend around a corner or make a 90 degree turn, the contoured side will not kink or distort in a fashion like the D-bulb, and will still make a complete seal the entire perimeter.

The sigma seal will also create a positive seal, even when not under full compression. The D-bulb works solely on complete compression and doesn't create much of a seal, unless compressed down to line to line. The contoured sides positively force the sealing lips with the sigma seal against the substrate, like a spring. As previously stated, when air or water pressure is added to the uncompressed, or compressed, seal, the seal positively actuates with more energy against both substrates. A contoured side to the seal can act as a gutter, when installed vertically. Water can flow into the cup or contour and run away from the sealing lips and exit correctly.

BRIEF DESCRIPTION OF THE DRAWINGS

These and other aspects of the invention will be apparent from the following description, with reference to the accompanying drawings, in which:

FIG. 16 is a prospective and a partially exploded view of a corner showing the relative positioning of the jacket and the molded corner piece;

FIG. 17 is an exploded, top view of the corner component with two jacket assemblies;

FIG. 18 is a bottom view of the corner component shown in FIG. 17;

DETAILED DESCRIPTION

Figure 1:
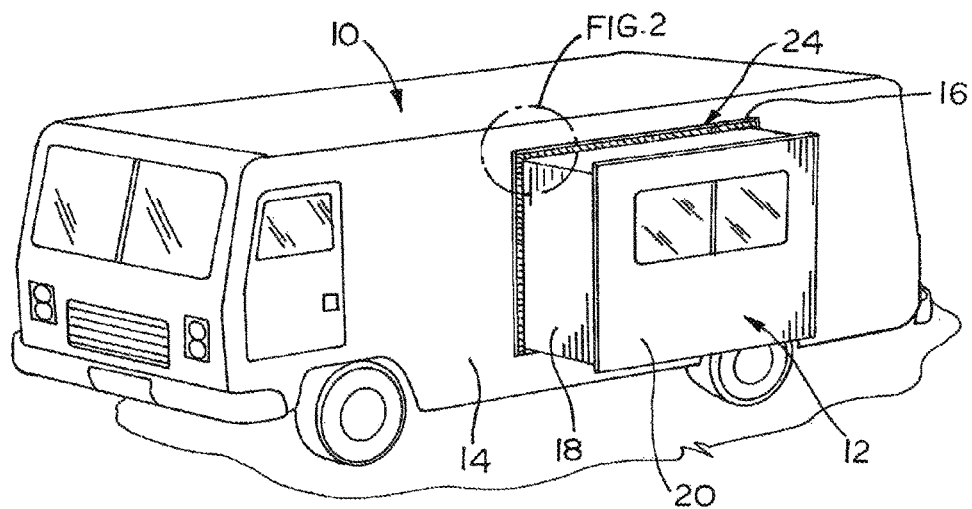
FIG. 1 shows a prior art mobile living quarters with a slide-out room in an extended position surrounded by the seal.
Figure 2:
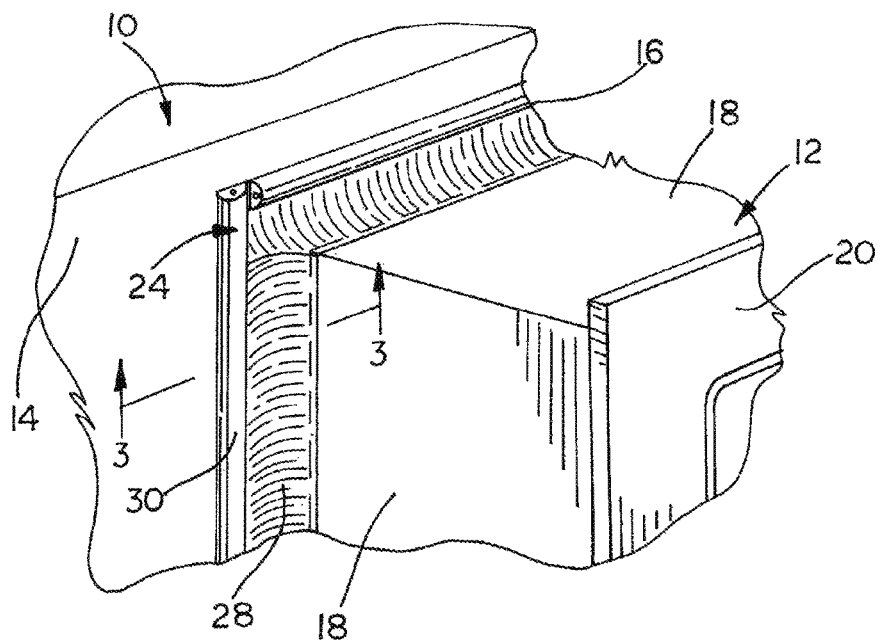
FIG. 2 is a fragmentary detail perspective view of the room and seal of FIG. 1.
Figure 3:
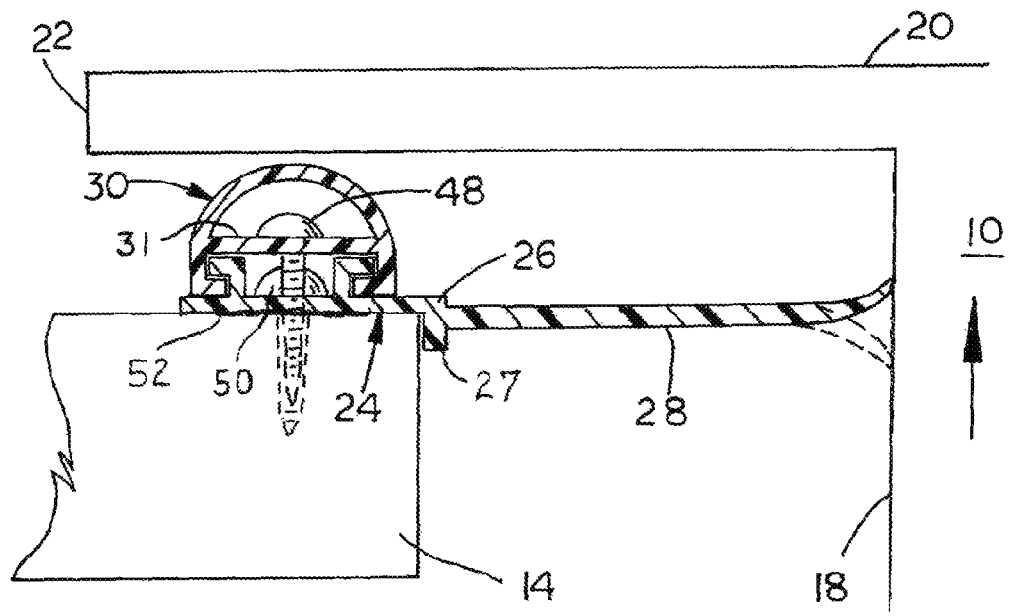
FIG. 3 is a fragmentary cross sectional view as seen along line 3-3 in FIG. 2.
Figure 4:
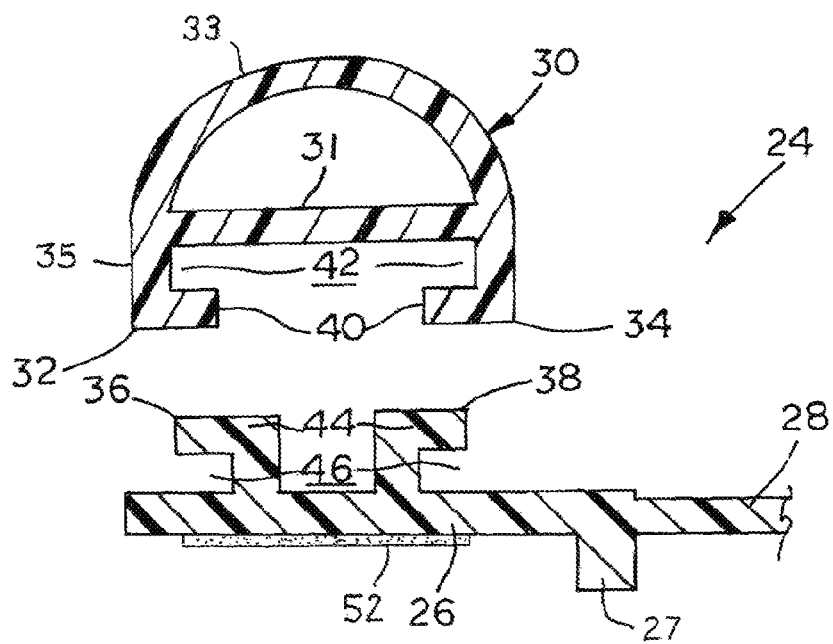
FIG. 4 is a detailed cross section of the resilient seal parts separated from each other.

The principles of the invention are disclosed, by way of example, in a continuous snap in track system shown in several embodiments as illustrated in FIGS. 6-25. The various embodiments which may be constructed in accordance with the invention include a rigid design for the jacket components of the system. More specifically, the jacket components are positioned so that the legs of the jacket are essentially parallel with sides of the vehicle wall, thereby creating a "positive" seal. That is, the jacket legs engage the wall at an angle of 0 degrees. The gap that would typically be created in the prior art by a compression jacket is replaced with straight legs that actually seal against the sides of the vehicle wall. Other features of the invention as illustrated in the drawings will be made apparent from the written description and the subsequent paragraphs herein. However, before setting forth detail of embodiments in accordance with the invention, the inventor wishes, for purposes of further understanding and background, to describe what is characterized as a buildable seal assembly, shown as buildable seal assembly 100 illustrated in FIG. 5. The buildable seal assembly illustrated in FIG. 5 and described in the immediately following paragraph is the subject of this inventor's own U.S. provisional patent application Ser. No. 62/106,965, titled BUILDABLE SEAL FOR SLIDE-OUT ROOMS, filed Jan. 23, 2015. The following paragraphs describe this buildable seal assembly 100, with respect to FIG. 5. Thereafter, continuous snap in track systems in accordance with the invention will be described with respect to FIGS. 6-25.

Figure 5:
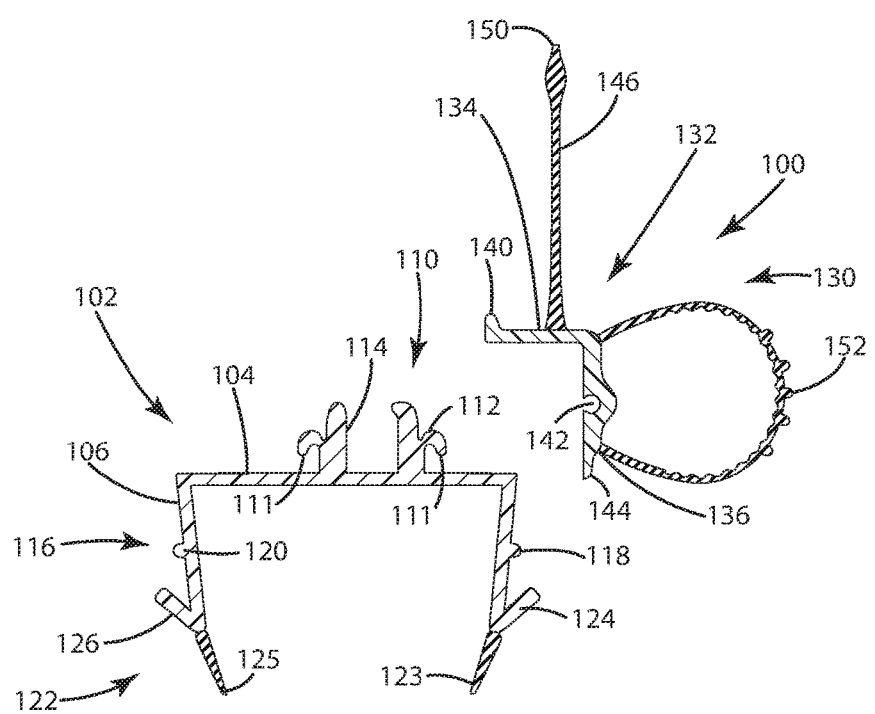
FIG. 5 is a sectional view of the buildable seal assembly for slide-out rooms in accordance with the invention.

The buildable seal assembly 100 is used in association with a jacket 102 as also shown in FIG. 5. The buildable seal assembly 100 can be characterized as a three-piece design which allows the user to snap the seal assembly into place, without the requirement of any type of sliding movement. The buildable seal assembly 100 is illustrated in FIG. 5 as showing the use of one bulb 152 and one wiper 146. However, seal assembly 100 is buildable in that multiple wiper components 146 and/or multiple bulbs 152 can be utilized. An advantage in accordance with the invention is that the OEM can choose the particular design, in terms of the number of bulbs and wiper components, yet still retain use of the same jacket 102. Still further, not only can the number of bulbs and wiper components be modified, but various lengths of wipers and sizes of bulbs can also be utilized.

Turning specifically to FIG. 5, the jacket 102 is shown in a "stand alone" version, and would be connected to the sidewall and slide-out room of a conventional RV or similar mobile equipment. The jacket 102 includes a first side 104. The first side 104 includes, extending from one surface therefrom, a pair of insert tabs 110. The insert tabs 110 include a first insert tab 112, and a second insert tab 114. The insert tabs are positioned in an opposing relationship and are utilized to capture nubs 140 of the buildable seal assemblies 100. The insert tabs 110 can each have an inwardly extending hook 111 for purposes of capturing the nubs 140.

In addition to the foregoing elements, the jacket also includes a first leg 106 which extends at an angle from one end of the first side 104 of the jacket 102. Correspondingly, a second leg 108 extends at an angle from the opposing end of the first side 104 of the jacket 102. It should be noted that the legs 106 and 108 of the jacket 102 will not necessarily be at right angles relative to the side 104 of the jacket 102, but instead may actually be angled inwardly greater than 90°, so as to apply a compressive force to the sealing lips 123 and 125. That is, this angling feature essentially provides the jacket 102 to be positively actuated with respect to the lips 123 and 125.

Positioned on the first leg 106 and second leg 108 are a pair of locator/retention lips 116. The locator/retention lips 116 include a first locator/retention lip 118 positioned on the outer side of the first leg 106, and a second locator/retention lip 120 positioned on the outer side of the second leg 108. The retention lips 116 are utilized in cooperation with the buildable seal assembly 100 to capture the seal assembly 100 in a "snap-in" relationship.

In addition to the locator/retention lips, the jacket 102 also includes a pair of retention tabs 122. The retention tabs 122 act so as to provide for retaining of one leg of the seal assembly 100. It is apparent that if two seal assemblies are utilized, then both retention tabs 122 would be used simultaneously. The retention tabs 122 comprise a first retention tab 124 located on the second leg of the jacket 102, and a second retention tab 126 located on the first leg 106 of the jacket 102. Positioned inwardly from the ends of the first and second legs 106, 108 of the jacket 102 are a pair of compression lips 123 and 125. Compression lip 123 extends inwardly from the end of the first leg 106 of jacket 102, while the other compression lip 125 extends inwardly from the end of the second leg 108 of the jacket 102. The compression lips 123, 125 serve to maintain position and seal of the jacket 102.

The buildable seal assembly 100 further includes a snap-in seal assembly 130, as also shown in FIG. 5. It should be emphasized that the snap-in seal assembly 130 is only one embodiment of seal assemblies in accordance with the invention. For example, multiple seal assemblies 130 may be utilized with the jacket 102. With reference to FIG. 5, the seal assembly 130 includes a right-angled seal element 132. The right-angled seal element 132 comprises the basic seal element which will be coupled to the jacket 102 in a snap-in configuration. The right-angled seal element 132 includes a pair of legs, identified in FIG. 5 as side leg 134 and angled leg 136. Each of the legs 134, 136 is configured at a 90 degree angle relative to the other leg. At the distal end of the side leg 134 is a nub 140. The nub 140, when the assembly 130 is coupled to the jacket 102, will be positioned so as to essentially be captured under the lip 111 of the first insert tab 112. Alternatively, the seal assembly 130 can be configured so that the nub 140 would be captured under the lip 111 of the second insert tab 114.

Positioned on one side of the angled leg 136, and essentially centered with respect thereto, is a slot 142. The slot 142, with the right-angled seal element 132 being resilient, is configured so as to capture the locating/retention lip 118 in a snap-in configuration.

Further with respect to the right-angled seal element 132, positioned at a distal end of the angled leg 136 is a tab 144. When assembled, the tab 144 is captured within the first retention tab 124, or the second retention tab 126. This configuration serves to stabilize the snap-in seal assembly 130 when coupled to the jacket 102.

The buildable seal assembly 100 can also include a wiper component 146 as further shown in FIG. 5. The wiper component 146 is flexible in nature, and facilitates the maintaining of an effective seal with the side wall (not shown in FIG. 5) at all times during extension or retraction of an associated slide-out room (not shown). The wiper component 146 includes an elongated wiper 148. Positioned at the distal end of the elongated wiper 148 is a bead 150. With respect to connection of the wiper component 146 to the right-angled seal component 132, the wiper component 146 can be molded onto the right-angled seal element 132 in line, while the same is being extruded.

In addition to the foregoing components, the snap-in seal assembly 130 can include a bulb 152 having a configuration as shown in cross-section in FIG. 5. It should be noted that the right-angled seal element 132 can be used with or without the wiper component 146, and also with or without the bulb 152. Still further, it can also be noted that the length of the wiper components 146 and the bulb sizes can be changed, in accordance with the invention.

In summary, the embodiments of the invention are utilized to create relatively water-tight seals around the perimeters of slide-out rooms of RV's and similar vehicles. The slide-out boxes on RV's telescope out of the wall, creating more square footage inside the unit. Since the room is dynamic, there is a requirement to have a seal around a perimeter, so as to stop the intrusion of light, water, and debris. The embodiments in accordance with the invention provide for several advantageous features.

For example, with the jacket 102 separate from the snap-in sealing element 132, an actual mitered corner can be achieved by cutting the jacket at a 45 degree angle. Other embodiments require the top seal to overlap the sides. This feature offers a significant performance advantage, by preventing leak paths due to the overlap, as well as providing a cosmetic advantage. The jacket 102 will allow the end consumer to trim the snap-in seal so as to match the mitered corner, or so as to use a molded insert.

Further, by having the insert tabs 110 and the retention tabs 122, an end consumer may repair a damaged snap-in seal with relative simplicity, by pressing the tab back and removing the same. Other systems require a complete removal of the jacket.

Of primary importance, the embodiments are buildable and the OEM can choose the design. In the particular embodiment shown in FIG. 5, the OEM can utilize one or two bulbs 152, and one or two wiper components 146. Further, the OEM can build different units on the same line, and use the same jacket and add or remove different snap-in seals, so as to accommodate the unit. Further, modifications can be made in the height of the wiper component or the size of the bulbs 152, and in the different combinations of the same. This provides a significant manufacturing advantage for line speed and tooling costs.

As earlier stated, some applications may just require the seal component 132. In such an event, the jacket 102 can be made thinner and trimming is facilitated.

The principles of the invention will be described in the following paragraphs, with respect to FIGS. 6-25. As earlier stated, numerous known sealing systems have jackets which result in a gap being created when the jackets tend to be compressed over the side walls of an RV. The shoulders of the jacket are wired in the wall, and the legs of the jacket "angled in" to create a compression on the edge of the sealing lip. Such a design opens up a gap from the shoulder, down to the sealing lip.

In accordance with the invention, the jackets are of a rigid design which engage the RV walls in a parallel configuration with the same, and create a positive seal. That is, the gap which typically exist with known systems no longer exists.

Further, another feature in accordance with the invention relates to the use of a molded corner. The installation of the molded corner allows for the horizontal and vertical jacket assemblies of the track system to be cut in a straight line at the corner, rather than having to be mitered. This feature will substantially increase the speed of installation, because no notching is required to have a top piece overlapping side pieces. Further, there is no need for trimming of inserts which can be involved in making a mitered corner.

Another feature in accordance with the invention relates to the concept that the track system allows an end consumer to repair the bulb or the wipe independently. That is, the bulb is a creative press fit design and can be removed and replaced without substantial effort. The wipes can be replaced by trimming off old wipes, and then using a replacement wipe piece on a living hinge structure. A rear of the replacement seal is tucked under the retention clip, and the front is taped down with a structural high bond tape, which fits into the recessed area.

Still further, with a two piece jacket assembly, the jacket allows the rigid design to fit on any wall width.

Another embodiment in accordance with the invention can utilize a one piece jacket component, with a living hinge. Such a configuration can utilize essentially the same two piece design which is utilized with a full section configuration. However, both jacket components are connected with a living hinge which will accommodate differences in wall widths. The living hinge creates a type of convolute or pleat.

Another advantage in accordance with certain embodiments of the invention relates to the capability of using what can be characterized as a half jacket component. In this regard, a number of individuals in the industry are of the opinion that water will always find a way into the sealing unit. Therefore, the best way to combat this issue is to give the water a way to evaporate out of the sealing system. A half jacket design in accordance with the invention allows the OEM to use either a half wall design, or use two together and leave the gap or other side of the wall open for the water to evaporate out. This featured configuration is identified in the following paragraphs as the "half section" configuration.

Still further, another feature in accordance with the invention relates to the use of a full outer lip seal. Having an outer sealing lip on the jacket, and also on the corner piece, offers a significant performance advantage by eliminating any need for caulking processes. In addition, the use of the outer sealing lip is advantageous in that it creates a correct watershed. Still further, a feature in accordance with certain concepts of the invention relate to the use of an interlocking corner design. This design relates to the manner in which corner tabs fit into the opening on a rigid jacket. Of particular importance is the fact that water intrusion can be eliminated by this interference fit.

Figure 6:
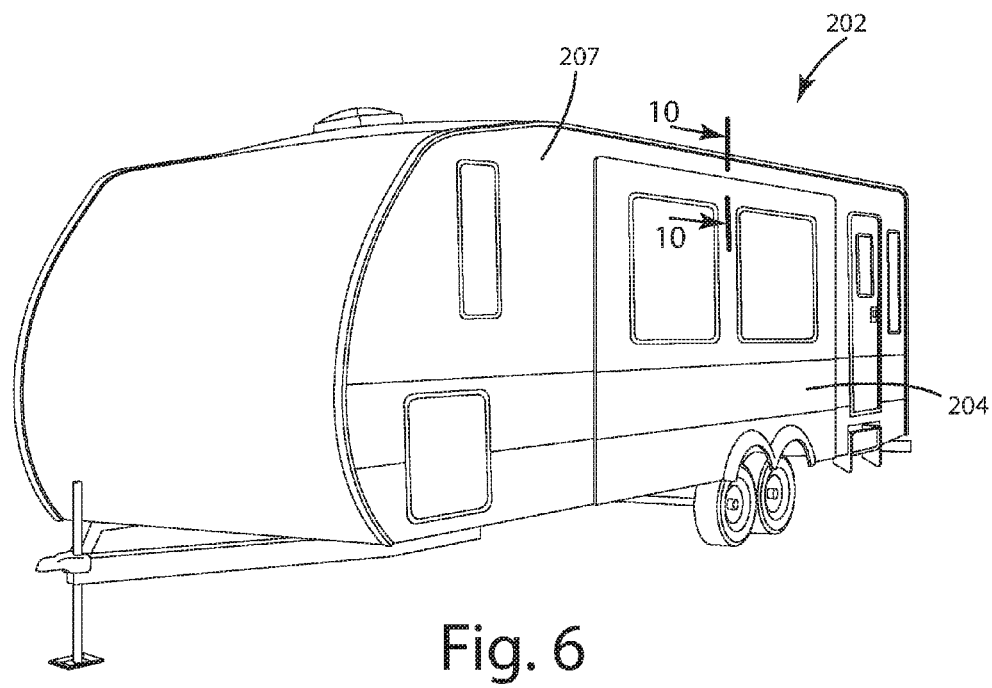
FIG. 6 is a prospective view of a mobile living quarters, having a slide-out room in a retracted position.
Figure 7:
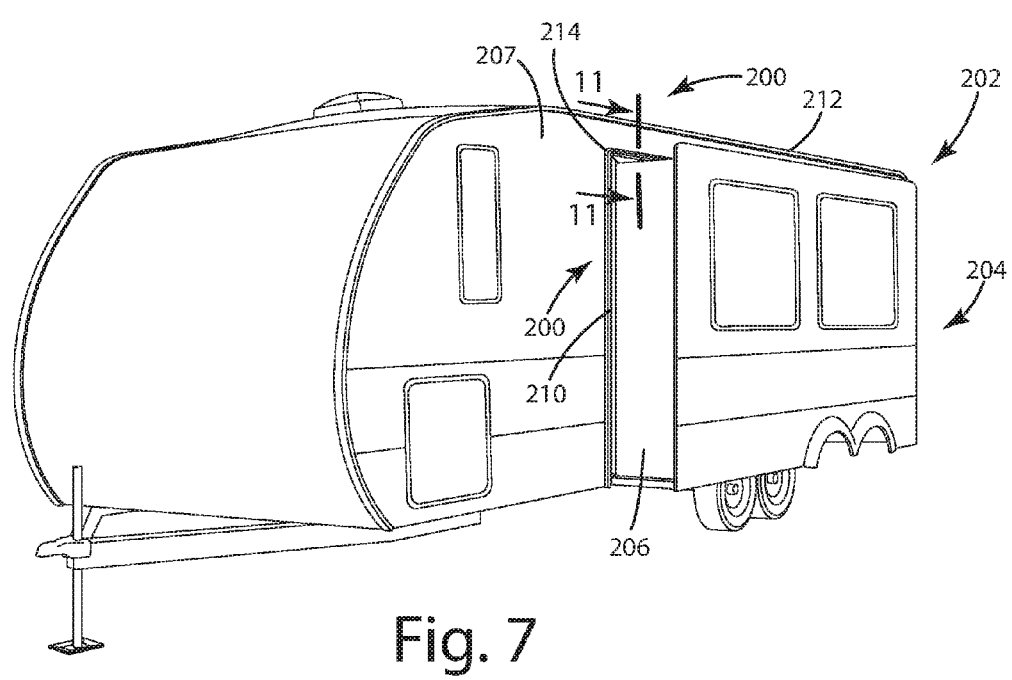
FIG. 7 is a prospective view similar to FIG. 6, but showing the slide-out room in an extended position, and surrounded by a sealing system in accordance with the invention.
Figure 8:
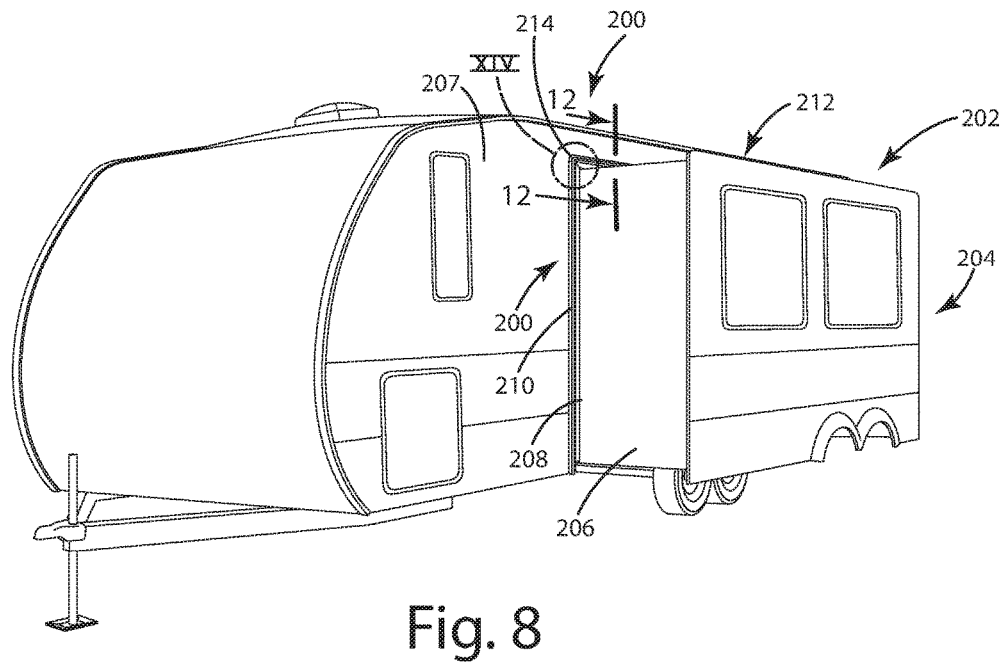
FIG. 8 is a prospective view of an RV vehicle similar to that of FIGS. 6 and 7, but showing the slide-out room in an fully extended position.

Turning to the various embodiments of a continuous snap in track system in accordance with the invention, a continuous snap in track system 200 is initially illustrated in FIGS. 6-13C. The track system 200 is illustrated in FIGS. 6-8 as being used with a residential vehicle or "RV" 202. With the exception of the track system 200, the RV 202 is conventional in design and well known throughout the tourism industry. As with many RV's, the RV 202 is equipped with a slide-out room 204 protruding through at least one sidewall of the RV. The slide-out room 204 includes an outer room wall 206. When the slide-out room 204 is in a retracted position (as shown in FIG. 6), the outer room wall 206 is essentially flush with an RV side wall 207.

Through conventional means, the slide-out room 204 can be released from its retracted position and be moved outwardly, so as to provide for additional interior RV space. FIG. 7 illustrates the slide-out room 204 in an intermediate, extended position. As illustrated in FIG. 7, the slide-out room 204 includes room sidewalls 206 (only one of which is shown in FIG. 7).

FIG. 8 illustrates the slide-out room 204 in a fully extended position. As illustrated in FIG. 8, as the slide-out room 204 is extended, a gap 208 is apparent between the slide-out room wall 206 and the RV sidewall 207. To protect against water damage and to essentially seal the various gaps 208 around the perimeter of the slide-out room 204, seal systems can be utilized, such as those described in prior paragraphs hereof. In this particular instance, the seal is in the form of a continuous snap and track system 200. The snap in track system 200 includes a vertical seal assembly 210 and a horizontal seal assembly 212. The horizontal seal assembly 212 will run along the top wall or ceiling (not shown in FIG. 6, 7 or 8). As described in subsequent paragraphs herein, the vertical seal assembly 210 and horizontal seal assembly 212 are coupled together through the use of a corner seal assembly 214.

Figure 9:
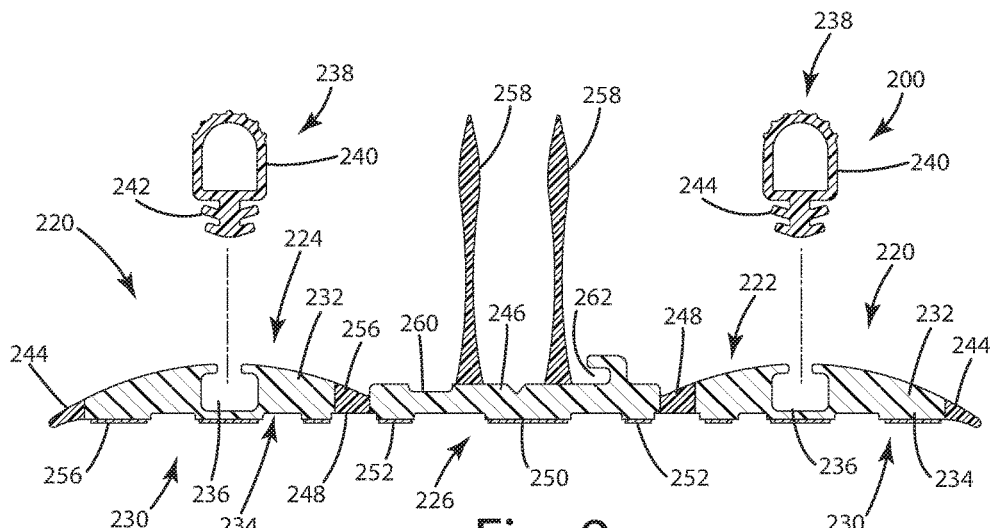
FIG. 9 is a front, sectional view of a jacket in accordance with the invention, in a standalone configuration, and showing the D-bulbs in a position to be positioned in the jacket sections, and further showing a living hinge in associated wipes position between the jacket sections.

The continuous snap in track system 200 will now be described, primarily with respect to FIGS. 9-19. With reference first to FIG. 9, the snap in track system 200 includes a pair of jacket assemblies 220, comprising a first jacket assembly 222 and a second jacket assembly 224. The jacket assemblies 220 are coupled together through the use of a flexible hinge assembly 226. Each jacket assembly 220 includes a jacket leg 230 having a cross-sectional configuration as illustrated in FIG. 9. As shown therein, each jacket leg 230 has an arcuate main body 232 with respect to an outer surface of each of the legs 230. Each leg 230 also includes a straight edge 234. Positioned in the outer arcuate edge of each of the jacket legs 230 is a D-bulb channel 236. The D-bulb channels 236 are adapted to receive D-bulb components 238, shown in a partially exploded configuration in FIG. 9. Each D-bulb component 238 includes a D-bulb 240 having the cross-sectional configuration shown in FIG. 9. Integral with the D-bulb 240 is a dart component 242. The D-bulb component 238 is adapted to "snap in" to the D-bulb channel 236 of each jacket leg 230, through the insertion of the dart 242.

As further shown in FIG. 9, each of the jacket legs 230 includes an outer sealing lip 244. As illustrated in FIGS. 10-13C, the sealing lip 244 can cooperate with corresponding lips on corner pieces (as described in subsequent paragraphs herein), so as to offer a significant performance advantage by eliminating the need for any type of a caulking process. The outer sealing lip 244 will also assist in forming an appropriate water shed.

With further reference to FIGS. 9-13C, snap in track system 200, as earlier stated, includes a flexible hinge assembly 226. The flexible hinge assembly utilizes living hinges which can accommodate differences in wall width. The living hinge assembly 226 creates a type of conbolute or pleat.

The living or flexible hinge assembly 226 includes a main hinge body 246, with the hinge body 246 having the cross-sectional configuration as particularly shown in FIG. 9. Coupled to the hinge body 246 by any suitable means are a pair of hinge components or living hinges 248. The living hinges 248 derive for flexibility and function in accordance with teachings previously described herein. The living hinges 248 are each coupled to opposing ends of the jacket legs 230. For purposes of securing and supporting the living hinge assembly 228 a central hinge pad 250 is secured to the central portion of the hinge body 246. Correspondingly, outer hinge pads 252 are secured to outer portions of the main hinge body 246.

For purposes of appropriately securing and positioning the jacket legs 230, each of the legs 230 includes a central jacket tape 254. Such tape can be one of a number of different commercially available tapes, such as 3M DHB (high bond tape). Correspondingly, each of the jacket legs 230 includes a pair of jacket pads 256. The jacket pads 256 can be constructed of a number of different types of materials, such as 30 Duro TPV. The jacket pads 256 assist in positioning and maintaining the position of the flexible hinge assembly 228.

In addition to the foregoing elements of the flexible hinge assembly 228, the assembly 228 also includes a pair of wipes 258. The wipes are secured to one wall of the main hinge body 246. Also positioned on the same side of the main hinge body 246 is a recessed tape area 260, and a retention clip 262. The purpose of these elements, related to replacement of wipes, will be explaining in the following paragraphs.

Figure 10:
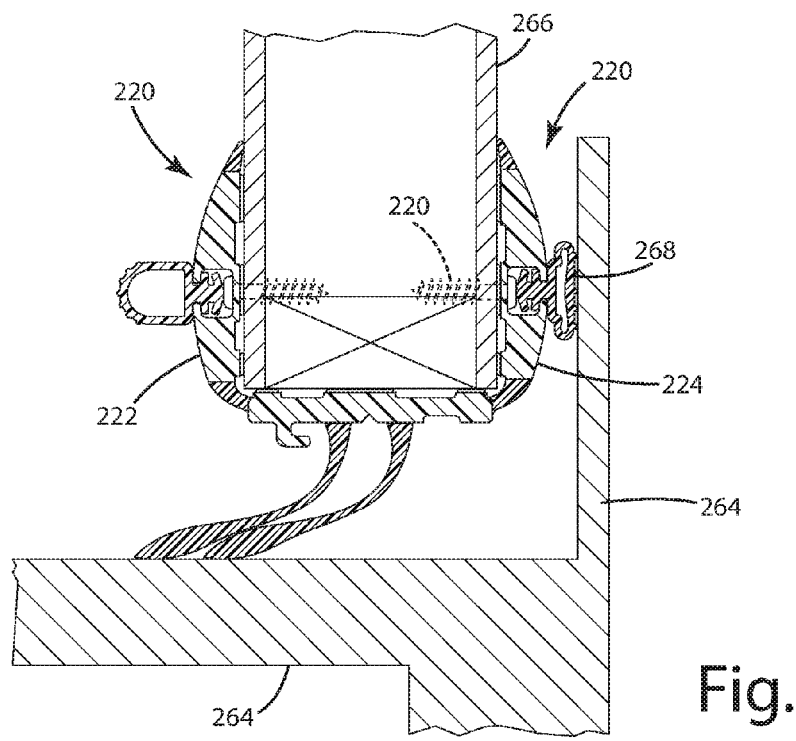
FIG. 10 is a sectional view showing the jacket in place, and taken along section lines 10-10 of FIG. 6.
Figure 11:
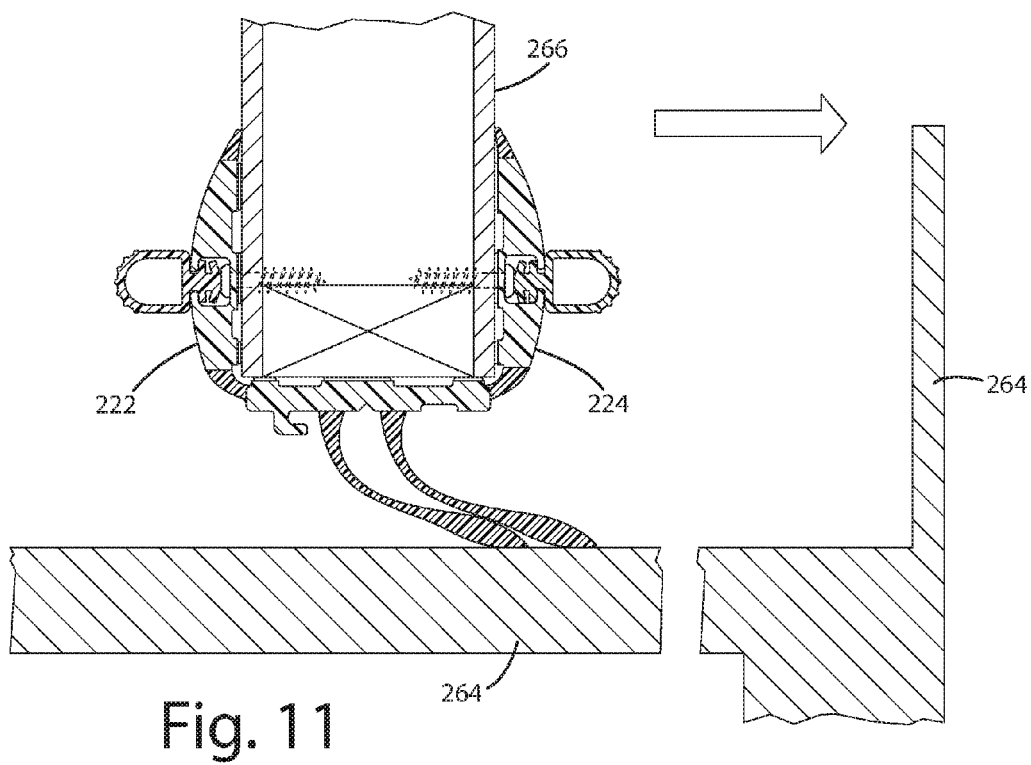
FIG. 11 is a sectional view similar to FIG. 10, but showing the jacket in a position taken along section lines 11-11 of FIG. 7.
Figure 12:
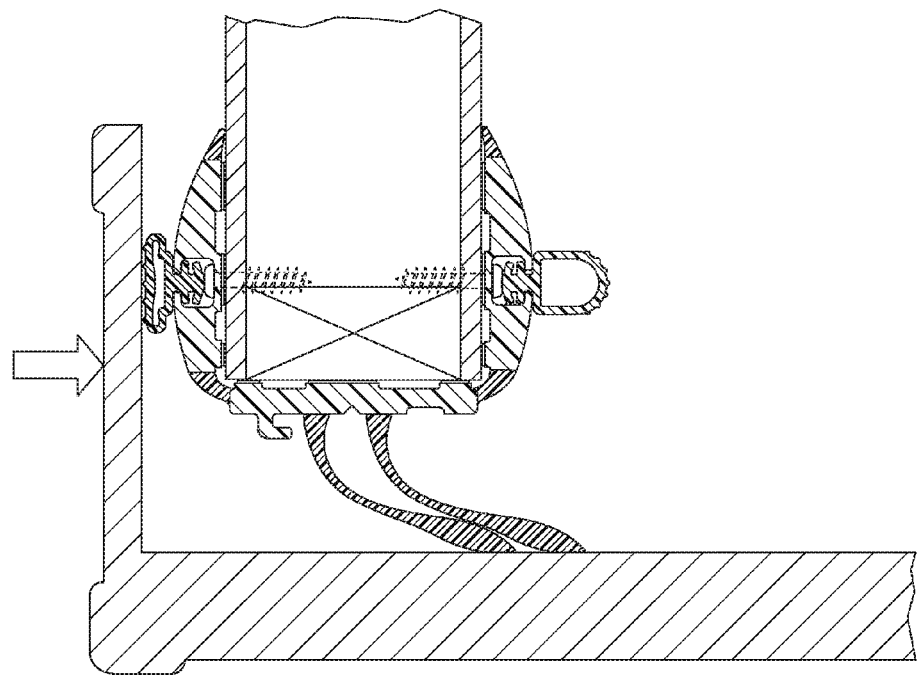
FIG. 12 is a further sectional view of the jacket with a D-bulb compressed against a wall of the slide-out room of the RV.
Figure 20:
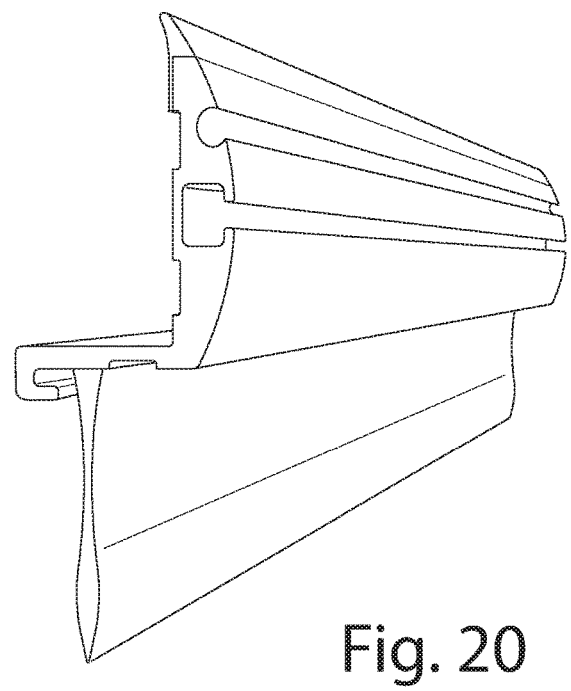
FIG. 20 is a prospective view of a half section of the continuous snap in track assembly, showing a half section jacket component, and having a slide for positioning an LED tape light for providing aesthetic illumination for the assembly.
Figure 21:
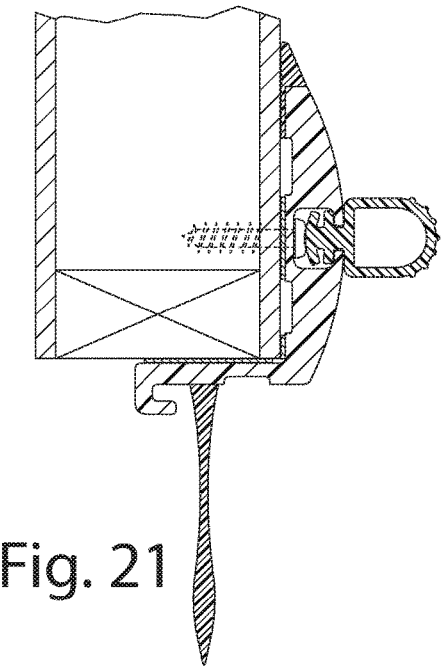
FIG. 21 is a cross sectional view showing the relative positioning of a half section of the jacket assembly as it is connected to a section of the RV body.
Figure 22:
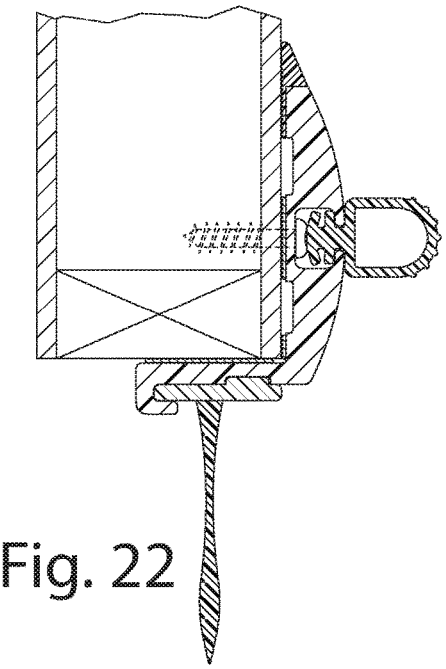
FIG. 22 is a cross section view similar to FIG. 21, but showing the half section being used with a replacement wipe.
Figure 23:
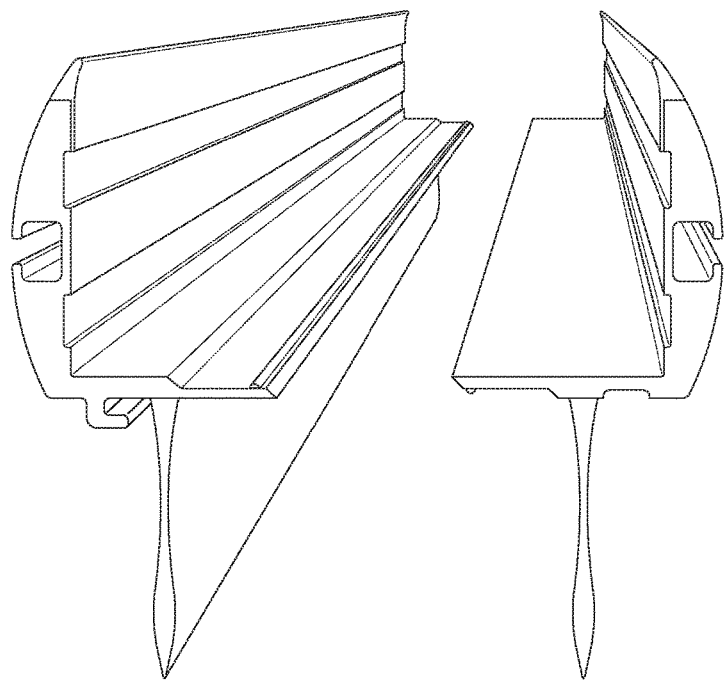
FIG. 23 is a prospective and partially exploded view showing a pair of cooperating half section jacket components.
Figure 24:
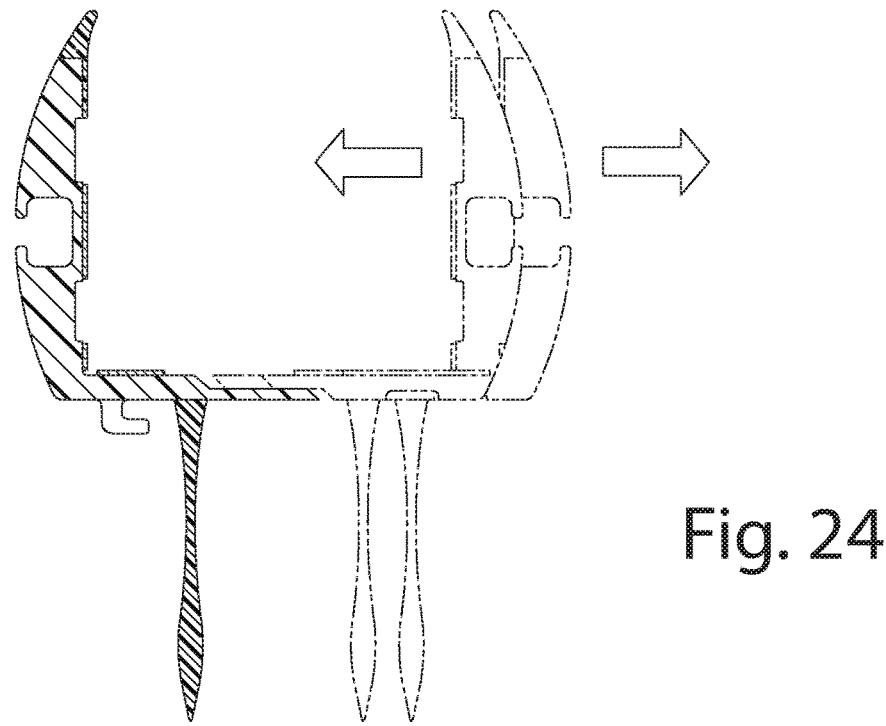
FIG. 24 is a partially cross sectional view of the cooperating jacket assemblies shown in FIG. 23, but showing their relative position as the half section jacket components are brought together in a overlapping configuration.
Figure 25:
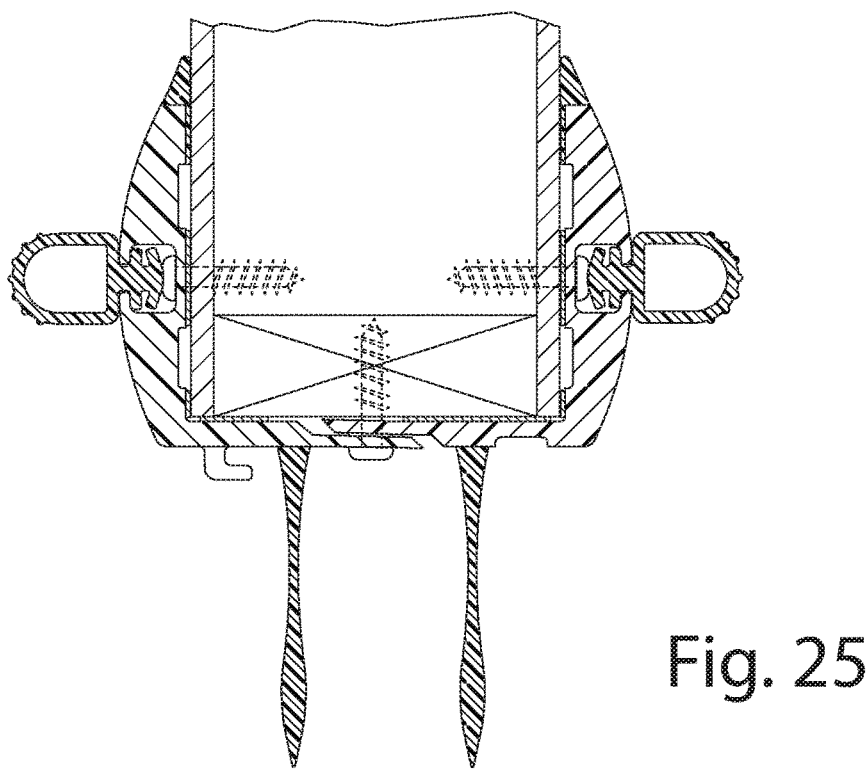
FIG. 25 is a cross sectional view similar to FIG. 24, but showing the half section jacket assemblies in a final conducting configuration, with the jacket legs also being secured to the RV wall.
Figure 26:
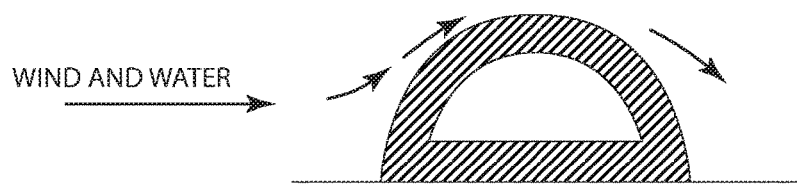
FIG. 26 is a prior art view of a D-bulb previously used as a seal.

FIG. 10 illustrates the continuous snap in track system 200 as it is positioned and captures a trailer wall 266. Also, FIG. 20 illustrates the position of the snap in track system 200 relative to the slide wall 264. The configuration shown in FIG. 28 would correspond to the position of the slide room shown in FIG. 6, with the slide room in a fully retracted position. Correspondingly, FIG. 11 is an illustration showing the continuous snap in track system 200 positioned on the trail wall 266, and with the slide room being moved outwardly so as to partially extended, such as is shown in FIG. 7. Correspondingly, FIG. 11 is a view of the continuous snap in track system 200 with the slide room in a fully extended position, such as is shown in FIG. 8. It should be noted that the jacket legs 230 are secured to the trailer wall 266 through a pair of bolts, self-tape in connecting screws or similar connecting means 268 which extend through apertures 270. It should also be noted, for example, with respect to FIG. 10, that one of the D-bulbs 240 is actually compressed against the slide wall 264 when the slide room is in the retracted position. Correspondingly, when the slide room is in the fully extended position, the other of the pair of D-bulbs 38 is compressed against a slide wall 264. Further, FIGS. 10-12 show the relative positioning of the wipes 258 as the slide room is moved from a retracted to an extended position.

Figure 13A:
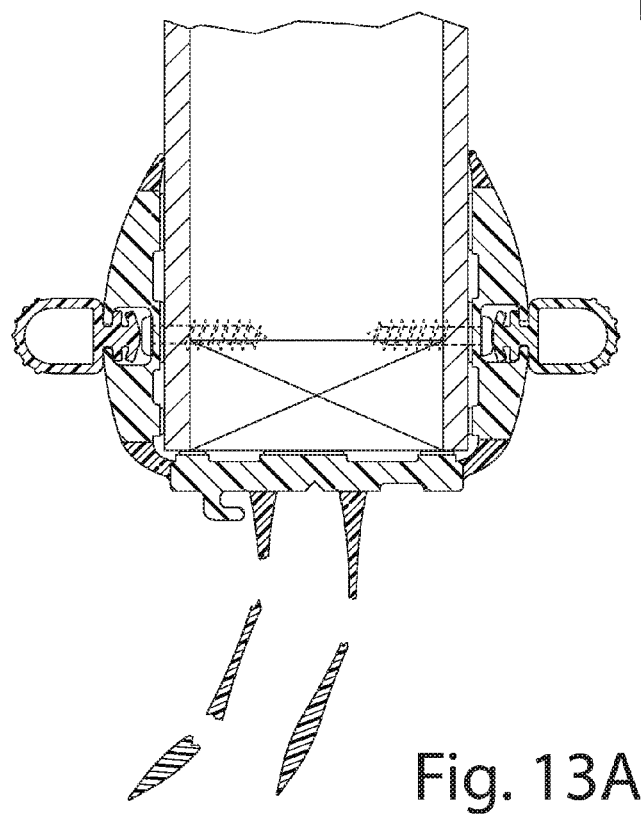
FIG. 13A is a sectional, standalone view of an embodiment of the continuous snap in track system in accordance with the invention, showing the jacket being captured around a wall of the trailer body in the same manner as shown in FIG. 12.
Figure 13B:
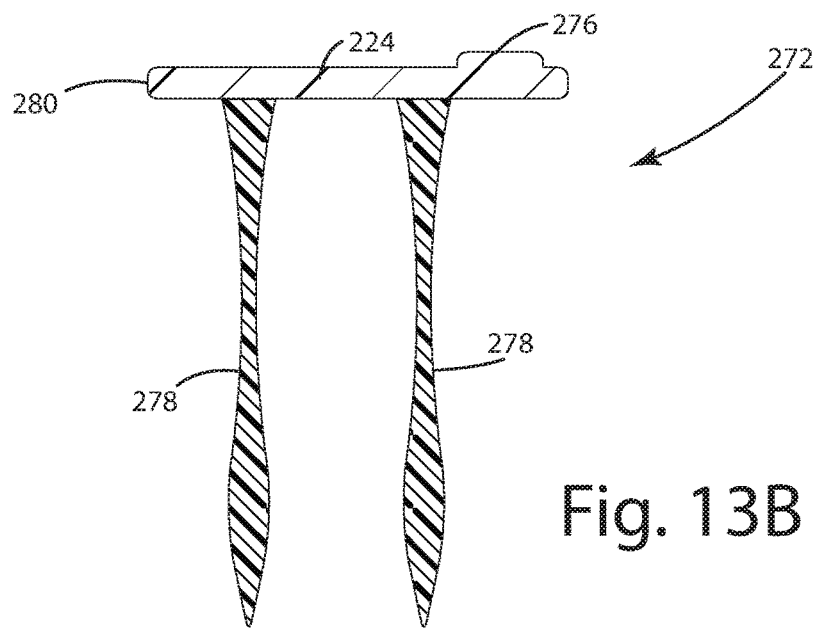
FIG. 13B is a standalone and sectional view of a replacement wipe component in accordance with the invention.

FIG. 13A illustrates a situation where the wipes 258 have been broken or otherwise worn beyond their useful lives. In such a case, and in accordance with another aspect of the invention, a replacement wipe assembly 272 is provided. A cross-sectional configuration of a replacement wipe assembly 272 in accordance with the invention is illustrated in FIG. 13B. As shown therein, the replacement wipe assembly 272 includes a replacement wipe base 274 having the cross-sectional configuration shown in FIG. 13B. Secured to one side of the replacement wipe base 274 is a replacement wipe tape 276. The replacement wipe tape 276 can be any of a number of commercially available tapes, such as 3M VHB.

Figure 13C:
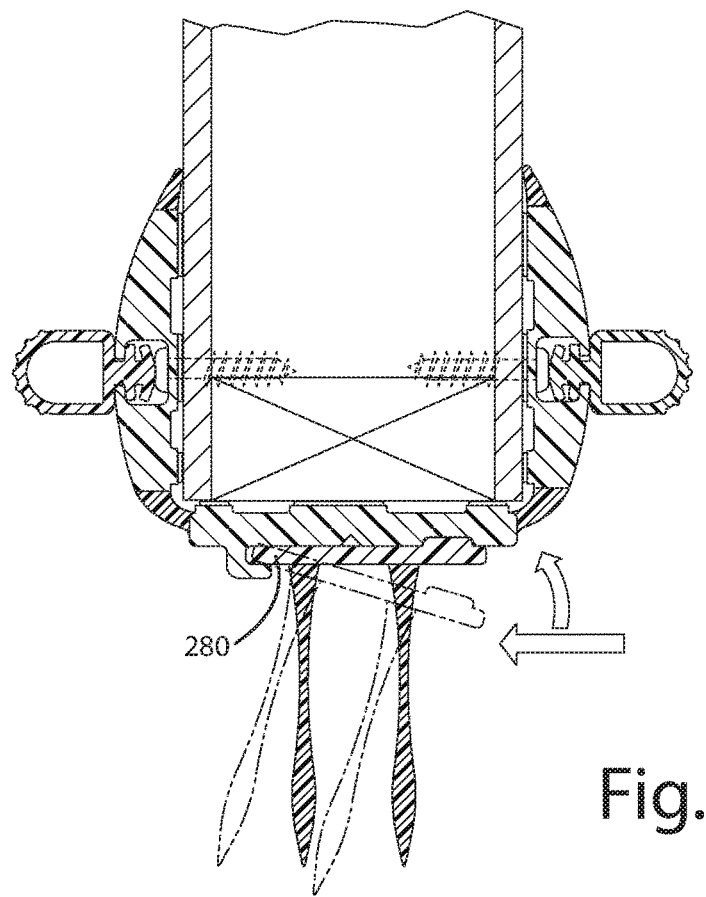
FIG. 13C is a cross sectional view of a portion of the continuous snap in track assembly similar to FIG. 13A, but showing how the replacement wipe is inserted and captured by the jacket assembly.

The replacement wipe assembly 272 also includes a pair of parallel wipes 278 which can be made substantially identical to the original wipes 258. To utilize the replacement wipe assembly 272, the assembly is coupled to the continuous snap in system 200 as shown in FIG. 13C. Specifically, one edge of the replacement wipe assembly 272 is designated as edge 280. Such designation is also shown in FIG. 13B. With the replacement wipe assembly 272 positioned at an angle relative to the continuous snap in track system 200, the user can essentially slide the retention edge 280 into the slot formed by the previously described retention clip 262. When the retention edge 280 is sufficiently positioned within the retention clip 262, the replacement wipe assembly 272 can be moved as shown by the arrows of FIG. 13C, so that the tape 276 is positioned within the recessed tape area 260. In this manner, replacement wipes can be readily and easily assembled for substitution.

In addition to the foregoing features in accordance with the invention, continuous snap in track systems in accordance with the invention include a system which employs a molded corner assembly with a lip 282. The molded corner assembly 282 is described in the following paragraphs, and illustrated in FIGS. 14-18. With reference to these drawings, the molded corner assembly 282 is formed so as to provide a seal and a path of travel for a D-bulb assembly in a slide-out configuration. With this configuration, and with co-axial D-bulb channels, an OEM will be able to use one continuous piece of D-bulb assemblies, without any breaks. This configuration will allow the OEM to build whatever size D-bulb is needed, and not have to worry about inventory of additional jackets. Further, the molded corner tabs of the channel pieces will fill the voids of the extruded jacket legs, and will prevent water intrusion. The corner assemblies will also complete a finished product, and complete the track for the D-bulb to be inserted.

Figure 14:
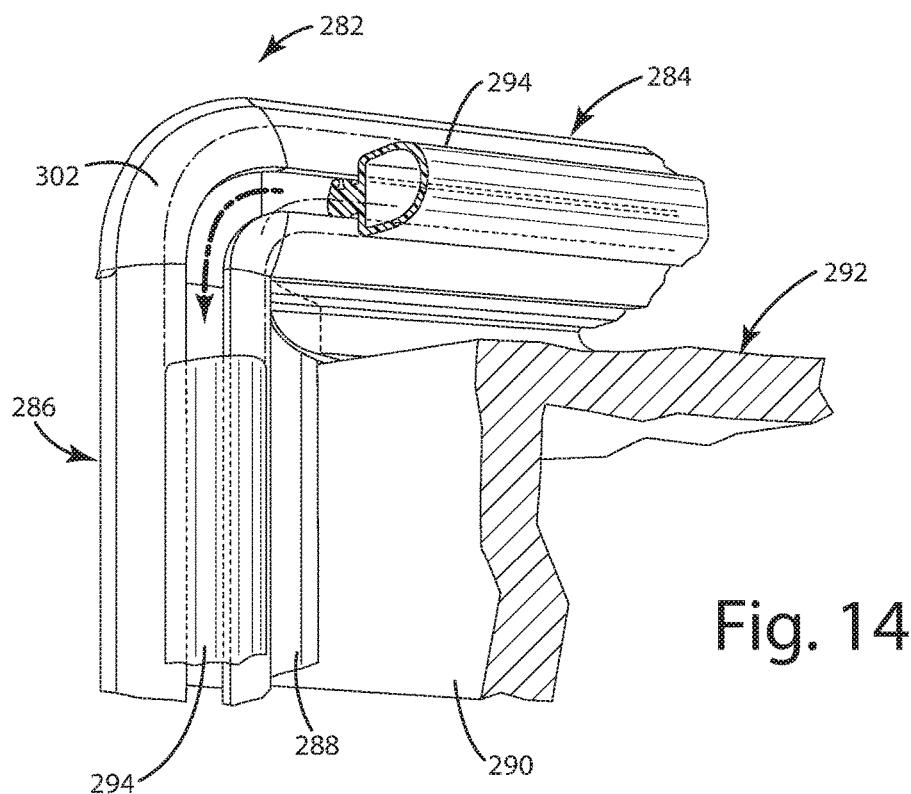
FIG. 14 is a partial prospective and partial cross sectional view of a molded corner component for use with the continuous snap in track assembly.
Figure 15:
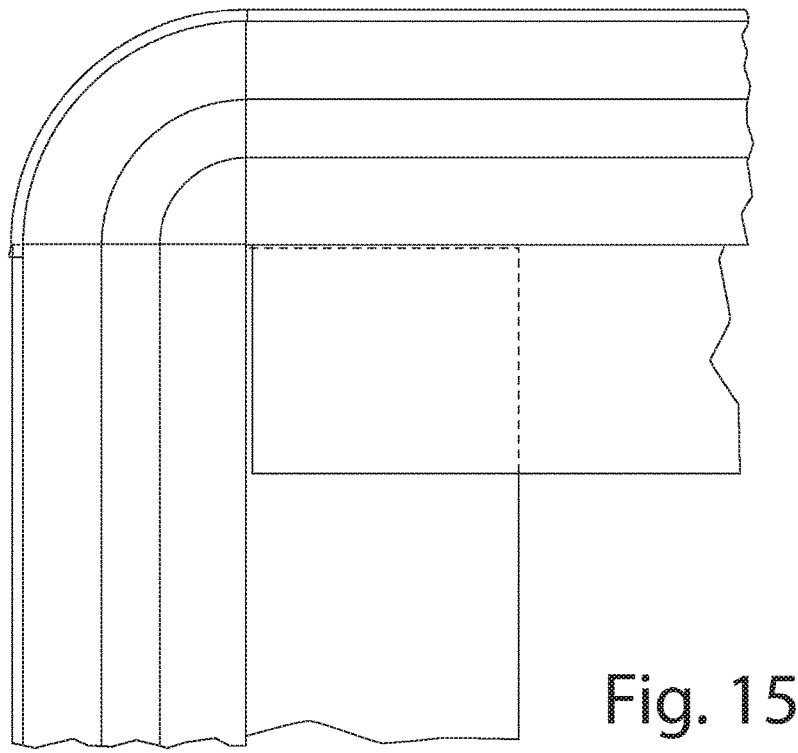
FIG. 15 is a top view of a portion of the continuous snap in track assembly, showing the relative positioning of the corner component.
Figure 19:
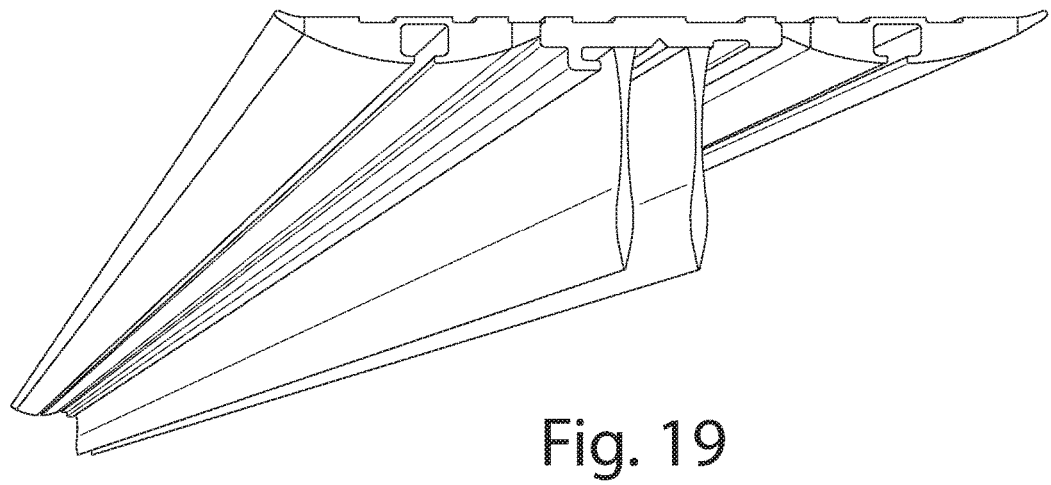
FIG. 19 is an underside, prospective view of one of the full jacket assemblies, showing use with a living hinge, and further showing a structure of the jacket assembly prior to positioning on the RV.

Turning to FIGS. 14-18, the molded corner assembly 282 includes a first continuous snap in assembly 284, and a second continuous snap in assembly 286, positioned perpendicular to each other are provided with each track assembly. As shown in FIG. 14, the continuous snap in track assembly is positioned adjacent a slot in wall 290, a slide room top 292. D-bulb channels 294 extend through both of the track assemblies 284, 286, as well as through the corner assembly 282.

Each of the continuous snap in track assemblies 284, 286 include what can be characterized as jacket assemblies 296 shown in FIG. 16. Positioned at the ends of the corner assembly 282 are a pair of water shed tabs 298. As earlier mentioned, with the use of full outer lip seals on the jackets and on the corner assembly 282 offers a significant performance advantage by eliminating the need for any type of caulking or similar securing process. The outer sealing lips will also create a corrected water shed.

FIG. 16 further illustrates the use of two of the corner assemblies 282, each connected to different jacket legs of different jacket assemblies. Connection is made through the use of connector tabs 300 which are positioned within the arcuate bodies 302. As particularly shown in FIG. 16, two of the corner pieces can be used, with each corner assembly 282 being fitted within a pair of the jacket legs associated with the snap in track assemblies 284, 286. As earlier stated, the molded corner assemblies 282 will fill the voids of the extruded jacket legs, and will prevent water intrusion. The corner assemblies 282 will also complete a "finished" look and also complete the track for the D-bulb to be inserted.

To date a D-bulb has been the ideal solution for sealing all windows, baggage doors, entry doors and also on slide-out seals. The seals have been made out of sponge EPDM, solid EPDM and thermoplastics such as TPE and TPV. Regardless of the material that they are made of, the D-bulb always has inherent flaws, as follows;

1. The seal relies on one contact point. If not compressed enough the seal will allow wind and water by. (illustrated on "d-bulb" picture)

2. The "D" profile doesn't always compress straight down and the bulb tends to shift. This can open up the seal for compression failure or cause accelerated wear.

3. If the "D" profile has to bend or follow a 90 degree turn to the side the profile will pucker and distort and not create a seal.

4. The "D" shape has to fold into itself to compress and if you try and us a higher durometer (hardness) to improve the wear the harder the seal is to compress.

5. If the seal is not compressed all the way flat (line to line or top to bottom) the higher the wind and water force the more likely the seal is to leak. The seal can't accommodate for pressure change well.

6. On a vertical application a "D" profile allows water to build up along the sealing edge and run back and forth until it finds a way passed. Another way to put it is that the radius top allows the water to flow to the sealing point when applied to an application where the profile will be vertical. The water can run over the radius and gather along the sealing edge and run back and forth until it finds a way in.

Intellectual Property—To get around the issues stated above the "Sigma Seal" profile can accommodate and correct all of the issues by changing the profile and how the seal collapses.

The Sigma Seal (SS) has three sealing lips along the non-bonded (style 1) or pressed in place (style 2) side. The three sealing lips create additional sealing points and the contoured sides act as a gutter to divert water away from the sealing points. The contoured sides also act like a pneumatic seal (u-cup) when installed between to mating parts. When the wind or water pressure increases it positively actuates the contoured cup and energizes the sealing lips. The higher the pressure the greater the seal.

The contoured sides of the SS allow the sealing edge to collapse straight down and not rock from side to side or cause distortion to the sealing area. The inside of the legs with have a wedge shape removed to promote correct compression or the legs can also have striations to perform the same function. This design will allow for a higher durometer of material to be used since the design allows for lower compression force and will extend the life of the seal.

The contoured sides also allow for the seal to make direction installation possible. When the has to bend around a corner or maker a 90 degree turn the contoured side will no kink or distort in a fashion like the D-bulb does and will still make a complete seal the entire perimeter.

The SS will create a positive seal even when not under full compression. The d-bulb works solely on complete compression and doesn't create much of a seal unless compressed down to line to line. The contoured sides positively force the sealing lips against the substrate like a spring. As mentioned prior, when air or water pressure is added to the uncompressed, or compressed, seal it positively actuates the seal with more energy against both substrates.

The contoured sides of the seal act as a gutter when installed vertically. Water can flow into the cup or contour and run away from the sealing lips and exit correctly.

Figure 27:
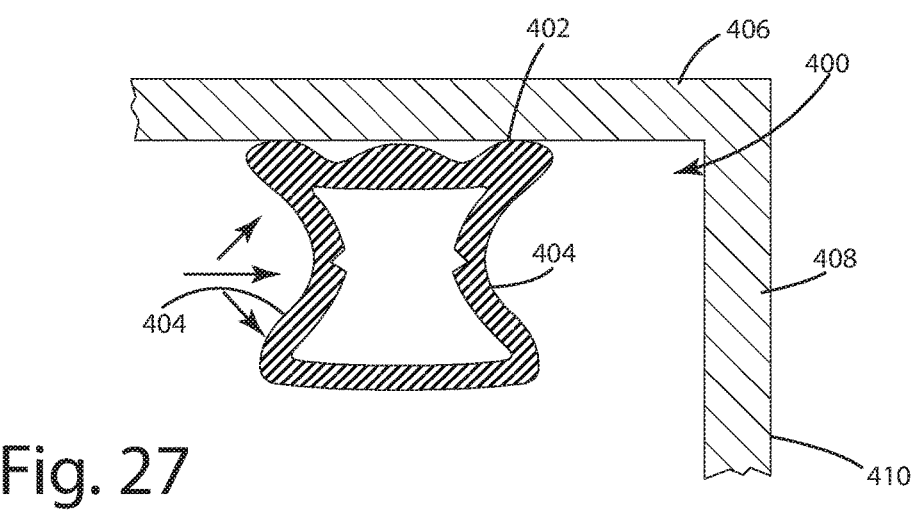
FIG. 27 is a cross sectional view of a sigma seal in accordance with the invention, showing its position relative to a wall or a static surface, having a top phalange.

A first embodiment of a sigma seal in accordance with the invention is illustrated as sigma seal 400. As earlier described, the seal 400 has three sealing lips 402 which will abut the top phalange 406 of an RV room or the like. The sigma seal 400 also includes, at the sides thereof, concave sections 404 which will operate to collapse when the seal is squeezed between a wall or a static surface 410 and the top phalange 406. A side of the moving RV room is also shown in FIG. 27 as said 408.

Figure 28:
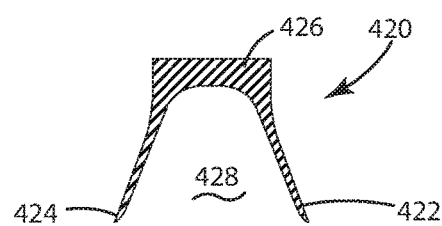
FIG. 28 illustrates a U-cup which can also be used in accordance with other aspects of the invention.

Another embodiment in accordance with the invention is a U-cup 420 shown in FIG. 28. The cup 420 includes sealing positions or edges 422 and 424. An upper section 426 is provided to abut the top phalange (not shown). The pressure in the interior 428 of the U-cup 420 will cause the cup to essentially inflate.

Figure 29:
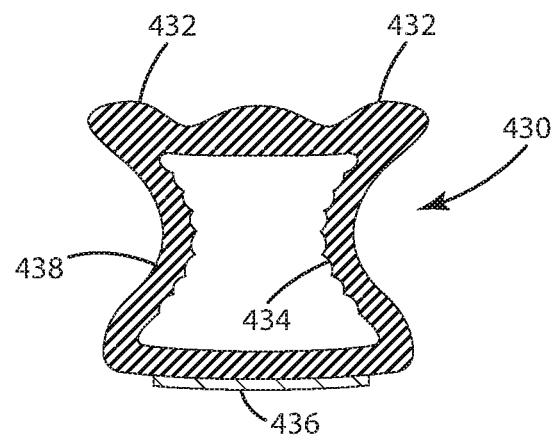
FIG. 29 illustrates a first embodiment of a sigma seal in accordance with the invention, showing the use of a tape or other high bond or transfer surface.

A further view of a first embodiment of the sigma seal in accordance with the invention is shown in FIG. 29 as seal 430. The seal 430 has three sealing lips 432. At an interior of the seal 430 are a set of striations 434. To seal the sigma seal 430 against a wall or static surface (not shown), a tape or high bonding medium or transfer medium 436 is shown. In addition, the seal includes concave sections 438 which will collapse as the seal 430 is compressed.

Figure 30:
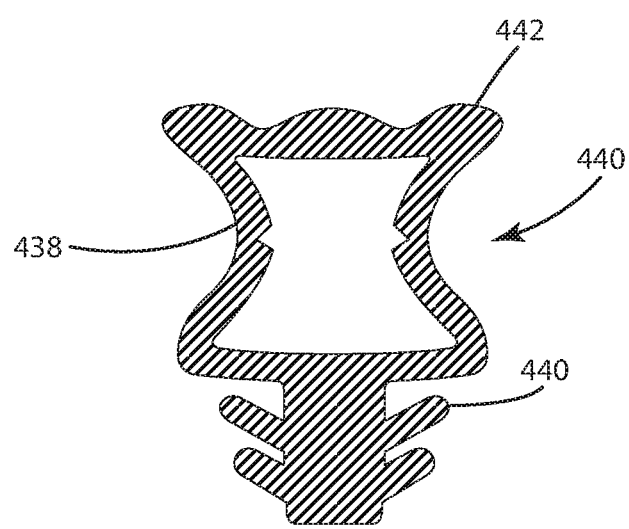
FIG. 30 illustrates a second embodiment of a sigma seal in accordance with the invention, where a dart is used to press the seal into place.

A further embodiment of a seal in accordance with the invention is shown in FIG. 30 as seal 440. Therein, the seal also includes three sealing lips 442, and concave side sections 438. However, instead of using a tape or other high bonding medium to seal the sigma seal against the wall or static surface, a dart 440 can be used.

It will be apparent to those skilled in the pertinent arts that other embodiments of the invention can be designed. That is, the principles of the invention are not limited to the specific embodiments described herein. Accordingly, it will be apparent to those skilled in the art that modifications and other variations of the above-described illustrative embodiments of the invention may be effected without departing from the spirit and scope of the novel concept of the invention.

The invention claimed is:

1. A seal assembly adapted for use in combination with a mobile living quarters, said mobile living quarters comprises:
    a slide-out room having a room interior and movable between a retracted, closed position and an extended, open position;
    at least one first side wall formed in an exterior wall of said mobile living quarters, said first side wall having a room opening form therein;
    said first side wall further comprises an exterior surface facing outwardly from an interior, an interior surface facing inwardly, and an end section;
    characterized in that said seal assembly comprises a seal component and a jacket, said seal component comprises:
        at least three sealing lips which abut said sidewall of said slide-out room when said slide-out room is moved to its closed or retracted position;
        means for securing said seal to a stationary surface of said mobile living quarters; and
        contoured sides positioned on opposing sides of said seal.

2. A seal assembly in accordance with claim 1, characterized in that said contoured sides are configured so as to act as a gutter to divert water away from sealing points formed by each of said sealing lips.

3. A seal assembly in accordance with claim 2, characterized in that said contoured sides further act as a pneumatic seal, when installed between two mating parts.

4. A seal assembly in accordance with claim 3, characterized in that as wind or water pressure increases, the contoured sides are positively actuated and sealing lips are energized, in that the seal pressure increases as said wind or water pressure increases.

5. A seal assembly in accordance with claim 2, characterized in that said contoured sides allow a sealing edge to collapse straight down without rocking from side to side or causing distortion in a sealing area.

6. A seal assembly in accordance with claim 5, characterized in that said seal comprises legs and the inside of each of said legs of said seal will have a wedge shape removed, so as to increase compression on said legs.

7. A seal assembly in accordance with claim 6, characterized in that said legs include striations which function so as to facilitate compression on said legs.

8. A seal assembly in accordance with claim 6, characterized in that the configuration of said legs allows for a higher durometer of material to be used, in view of said seal assembly allowing for lower compression forces.

9. A seal assembly in accordance with claim 7, characterized in that said seal comprises substrates and even when said positive seal is not under full compression, said contoured sides positively force said sealing lips against said substrates in a spring-like configuration, so that when air or water pressure is added to said seal, said seal positively actuates with additional energy against said substrates.

10. A seal assembly in accordance with claim 2, characterized in that said contoured sides of said seal act as a gutter when installed in a vertical configuration.

11. A seal assembly in accordance with claim 2, characterized in that:
    said seal comprises legs and said contoured sides act as a gutter when in a horizontal application, so that said seal will allow the contoured sides to remove water and debris away from said sealing lips;
    said assembly provides for positively actuating said sealing lips along both surfaces, when wind or water pressure is increased; and
    said configuration of said contoured sides facilitates compression, with the use of ridges or removal of a pie-shaped wedge from inside of said legs.

\* \* \* \* \*